(12) United States Patent
Furukawa

(10) Patent No.: US 8,504,191 B2
(45) Date of Patent: Aug. 6, 2013

(54) METHOD FOR PICKING UP WORK PIECES

(75) Inventor: Makoto Furukawa, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 36 days.

(21) Appl. No.: 13/122,761

(22) PCT Filed: Sep. 3, 2009

(86) PCT No.: PCT/JP2009/004352
§ 371 (c)(1),
(2), (4) Date: Jun. 14, 2011

(87) PCT Pub. No.: WO2010/041371
PCT Pub. Date: Apr. 15, 2010

(65) Prior Publication Data
US 2011/0251717 A1   Oct. 13, 2011

(30) Foreign Application Priority Data

Oct. 10, 2008   (JP) .................................. 2008-264030

(51) Int. Cl.
*G06F 7/00*   (2006.01)
(52) U.S. Cl.
USPC ........................................................ 700/218
(58) Field of Classification Search
USPC ......................................... 700/218, 213, 219
See application file for complete search history.

(56) References Cited

U.S. PATENT DOCUMENTS

| | | | |
|---|---|---|---|
| 7,966,094 B2 * | 6/2011 | Ban et al. ...................... | 700/260 |
| 8,165,929 B2 * | 4/2012 | Chudy et al. ..................... | 705/28 |
| 2007/0177790 A1 * | 8/2007 | Ban et al. ...................... | 382/153 |

FOREIGN PATENT DOCUMENTS

| | | |
|---|---|---|
| CN | 101274433 | 10/2008 |
| EP | 1385122 A1 | 1/2004 |
| EP | 1589483 A2 | 10/2005 |
| GB | 2261069 A | 5/1993 |
| JP | 2002-200588 | 7/2002 |

OTHER PUBLICATIONS

Yanagihara Y et al.: "Parts Picking in Disordered Environment", International Workshop on Intelligent Robots and Systems IROS '91; Nov. 3-5, 1991, Osaka, Japan, six pages.
Chinese Office Action, Application No. 200980137483.7, dated May 6, 2013 and partial English translation, 7 pages.

* cited by examiner

*Primary Examiner* — Ramya Burgess
(74) *Attorney, Agent, or Firm* — Rankin, Hill & Clark LLP

(57) ABSTRACT

The method for picking up work pieces includes: storing a representative partial shape, at least one of holding positions in the representative partial shape, and a preference rank for each of the holding positions; obtaining an image information by sensing the work pieces which are accumulated; recognizing exposed portions in the work pieces by performing an edge detection on the image information; selecting at least one of the exposed portions including the representative partial shape as a selected portion; detecting at least one of coinciding portions coinciding with the representative partial shape in the selected portions; determining an optimal holding position from at least one of the holding positions included in the coinciding portion as a determined holding position, based on the preference rank; and transmitting a holding command to hold the determined holding position.

4 Claims, 6 Drawing Sheets

METHOD FOR PICKING UP WORK PIECES

TECHNICAL FIELD

The present invention relates to a method for picking up work pieces. More specifically, the present invention relates to a work piece picking up method which is employed for picking up work pieces one-by-one from multiple randomly accumulated and unarrayed work pieces.

This application claims priority on Japanese Patent Application No. 2008-264030 filed on Oct. 10, 2008, the content of which is incorporated herein by reference.

BACKGROUND ART

A technique is known for picking up work pieces using a robot, including a process of capturing an image of randomly accumulated work pieces with a camera, a process of comparing the obtained two-dimensional image with a master model, and a process of holding a work piece if the degree of the coincidence satisfies the predetermined value (See Patent Document 1). As the stored master model, there exists a first master model that includes an entire work piece and a second master model that corresponds to a holding position.

RELATED ART DOCUMENT

Patent Document
[Patent Document 1] Japanese Unexamined Patent Application, First Publication No. 2002-200588

DISCLOSURE OF THE INVENTION

Problems to be Solved by the Invention

In the above described related art, the two-dimensional image is checked with the first master model, thereby extracting work pieces as candidates for a work piece to be held. Then, the extracted work pieces to be held are checked with the second master model, thereby determining whether the work piece can be held or not. However, in most cases, the actual randomly accumulated work pieces are placed in an overlapping state, therefore, there is a problem in that it is difficult to match an image of the work pieces in such state with preliminarily computed holding poses. In addition, work pieces having elongated shapes or complicated shapes have a tendency to catch other work pieces at the time of being picked up, thereby picking up other work pieces together. Therefore, it is necessary to select a suitable holding position in consideration of the picking up direction.

The present invention has been made in view of the above problems, and an object of the present invention is to provide a work piece picking up method that can pick up work pieces in a short time and prevent the work piece from catching other work pieces at the time of being picked up.

Means for Solving the Problems

The present invention employs the following measures to solve the above problems.
(1) A method for picking up work pieces according to an aspect of the present invention includes: storing a representative partial shape, at least one of holding positions in the representative partial shape, and a preference rank for each of the holding positions; obtaining an image information by sensing the work pieces which are accumulated; recognizing exposed portions in the work pieces by performing an edge detection on the image information; selecting at least one of the exposed portions including the representative partial shape as a selected portion; detecting at least one of coinciding portions coinciding with the representative partial shape among the selected portions; determining an optimal holding position from at least one of the holding positions included in the coinciding portion as a determined holding position, based on the preference rank; and transmitting a holding command to hold the determined holding position.
(2) In the method for picking up the work pieces according to (1), the preference rank may be set based on the degree of tendency to not catch other work pieces when the holding position is held to pick up the work piece.
(3) In the method for picking up the work pieces according to (1), the preference rank may be set based on the degree of ease to hold the holding position.
(4) The method for picking up the work pieces according to (1) may further include: obtaining clearance information regarding a vicinity of each of the holding positions; and if a clearance is insufficient in accordance with the clearance information, selecting a holding position having a next precedent preference rank.

Effects of the Invention

According to the method as described in (1), since selected partial shapes and preference ranks of the holding positions are preliminarily determined, it is possible to determine a position to be held in the randomly accumulated work pieces in a short time, thereby making it possible to pick up the work pieces at high speed. In addition, by selecting, for each partial shape, the portion having a precedent preference rank of the holding positions suitable for being picked up, it is possible to obtain an effect of reliably preventing the work piece from catching other work pieces at the time of being picked up.

According to the methods as described in (2)-(3), a portion where other work pieces tend to not be caught or a portion by which a robot can easily hold is preferentially determined as a position to be held, therefore, it is possible to obtain an effect that the work pieces can be held without interference.

According to the method as described in (4), it is possible to select a holding position of the work piece having a sufficient clearance, thereby making it possible to obtain an effect that the work pieces can be held without interference.

EMBODIMENTS OF THE INVENTION

Figure 1:
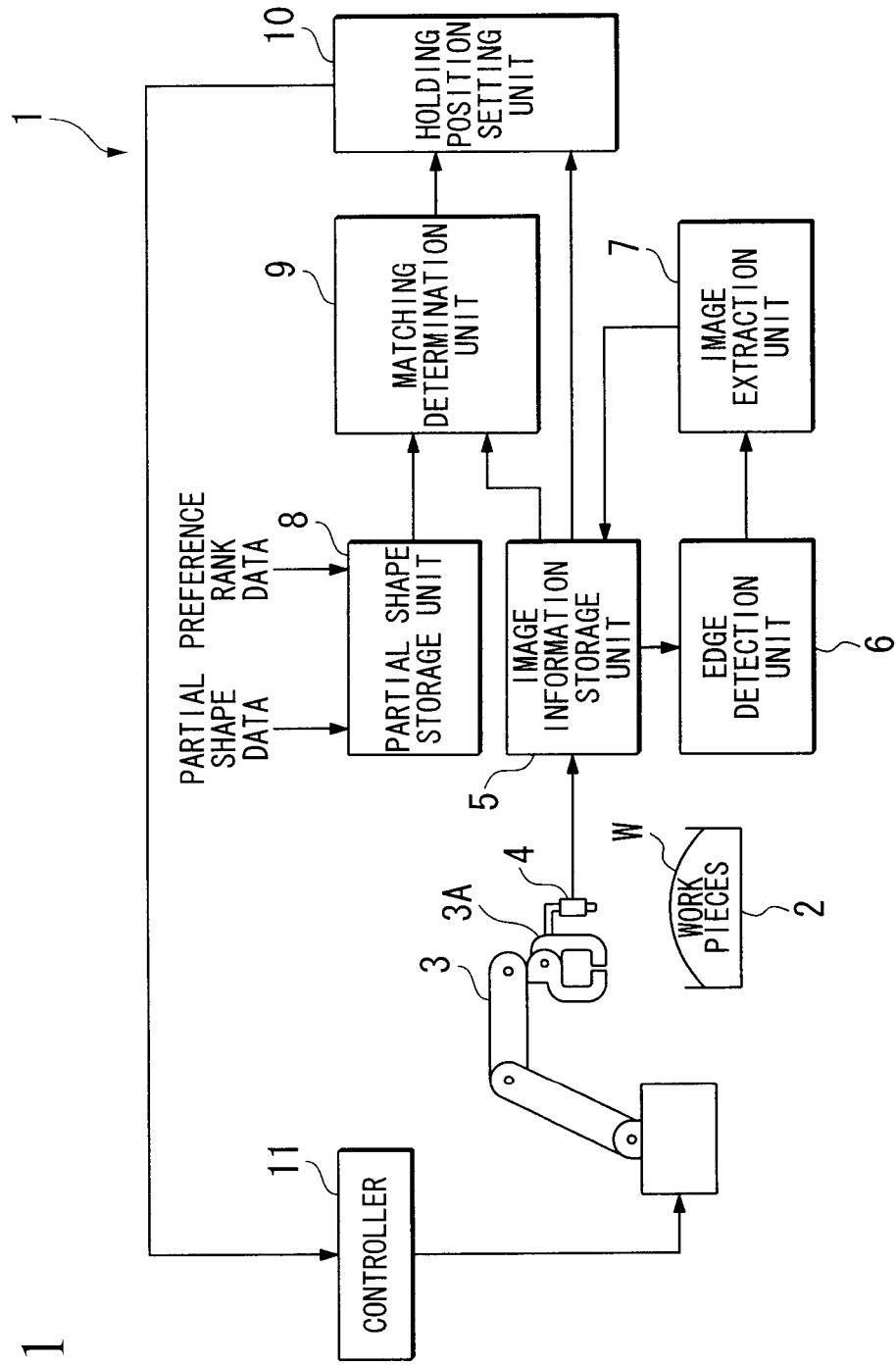
FIG. 1 illustrates a block diagram of a work piece picking up apparatus according to an embodiment of the present invention.

Hereinafter, an embodiment of the present invention is explained based on the drawings. FIG. 1 illustrates a work piece picking up apparatus 1 used in an embodiment of the present invention. This work piece picking up apparatus 1 picks up work pieces W which are randomly accumulated in a bucket 2 one-by-one with a robot arm 3A of a robot 3, and then, for example, introduces the work pieces to a vehicle assembling line. The reference number 4 represents a stereo camera. The stereo camera 4 is attached to the robot arm 3A of the robot 3. The stereo camera 4 obtains three-dimensional image information of multiple identically shaped work pieces W accumulated in the bucket 2 from the above.

The image information obtained by the stereo camera 4 is stored in an image information storage unit 5. The image information includes RGB values of each pixel as brightness information, and a distance information (mm, cm) of each pixel. It should be noted that, instead of the stereo camera 4, a three-dimensional scanning unit using a laser or a three-dimensional sensing unit using an imaging sensor that can detect the distance may be used for obtaining distance information associated with the brightness information for each of the corresponding pixels.

The image information storage unit 5 is connected to an edge detection unit 6 that performs edge detection on the image based on the stored image information. The edge detection unit 6 is connected to an image extraction unit 7 that cuts out a partial image based on a border line defined by the edge portion detected by the edge detection, that is, based on a border portion K (see FIG. 6) of an exposed portion of the work piece W. By means of the image extraction unit 7, among the randomly accumulated work pieces W, some work pieces W substantially near the top position in which the overlapping degree is small are selected. At this time, the work pieces W on the top position are selected from the image selected based on the distance information. This selection is made at the time of performing edge detection by the edge detection unit 6. The cut out partial images are stored in the image information storage unit 5.

The reference number 8 represents a work piece partial shape storage unit. The partial shape storage unit 8 preliminarily stores partial shapes of a part of the dealt work pieces and holding positions of the partial shapes. To each of the holding positions of the partial shapes, preference rank is given in an order of the optimal holding position. As to the preference rank which is explained in detail later, the precedent rank is given to a portion that can be easily held without catching other work pieces W. In the partial shape storage unit 8, data of partial shapes of the work pieces W and data of preference ranks for being held are preliminary stored.

The reference number 9 represents a matching determination unit. The matching determination unit 9 performs pattern matching to determine whether or not image information of an exposed portion of the work piece W stored in the image information storage unit 5 matches with a partial shape of the work piece W stored in the partial shape storage unit 8. If the matching determination unit 9 determines that the target work pieces W include a portion which matches with a partial shape stored in the partial shape storage unit 8, the holding position setting unit 10 sets the portion to which the most precedent preference rank for holding in the partial shape of the work piece W is given, as a holding position of the work piece W.

The holding position setting unit 10 is connected to a controller 11 that controls an operation of the robot arm 3A.

The holding position setting unit 10 also receives clearance information regarding a vicinity of each of the holding positions included in the image information, from the image information storage unit 5. If the clearance is sufficient for the robot arm 3A to hold the holding position, the robot arm 3A holds that position. For checking the clearances regarding a vicinity of each of the holding positions, the clearance may be obtained from the three-dimensional image information. However, the existence of the clearance may be also checked by moving the robot arm 3A near the holding position so as to obtain image information from different aspects.

FIGS. 2A-2D illustrate representative partial shapes included in the work pieces W to be held, and preference ranks of the holding positions suitable for picking up the work piece. The description of "suitable for picking up the work piece" means that the work piece is easily picked up, that is, the work piece tends to not catch other work pieces when the work piece is assumed to be picked up along the direction by which other work pieces are most unlikely to be caught. Meanwhile, the preference ranks are given based on an absolute evaluation so that the ranks can be referred to not only among the identical partial shapes, but also among the different partial shapes.

Figure 2A:
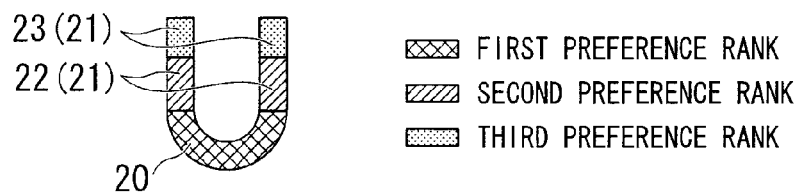
FIG. 2A illustrates a U-letter type partial shape, which is one of representative partial shapes in work pieces according to the embodiment.

FIG. 2A illustrates a U-letter type partial shape which is one of the representative partial shapes included in the work pieces W. This U-letter type partial shape tends to catch other work pieces W if a particular position is held for picking up the work piece from the bucket 2. This U-letter type partial shape is formed by an arcuate portion 20, and parallel extending portions 21, 21 that extend from each end of the arcuate portion 20. Among the holding positions in this U-letter type partial shape of the work piece, the first preference rank is assigned to the arcuate portion 20. The second preference rank is given to straight portions 22, 22 that extend from the arcuate portion 20. The third preference rank is given to straight portions 23, 23 that include end portions continuing from the straight portions 22, 22.

Figure 3:
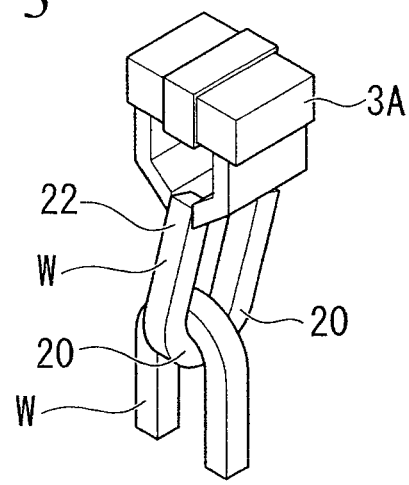
FIG. 3 illustrates a perspective view of a state in which an end portion of the U-letter type work piece is held according to the embodiment.
Figure 4:
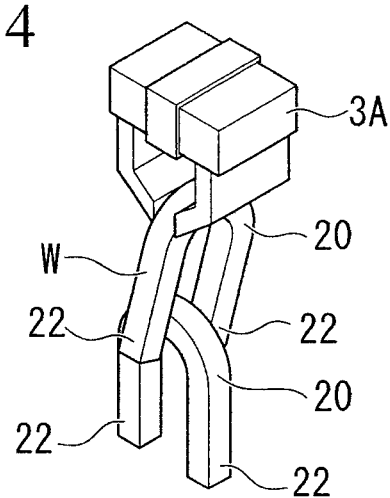
FIG. 4 is a perspective view of a state in which an arcuate portion of the U-letter type work piece is held according to the embodiment.

That is, as illustrated in FIG. 3, if the robot arm 3A holds one of the straight portions 23, 23 including the end portions, an arcuate portion 20 of other work piece W is likely to be caught. However, as illustrated in FIG. 4, the work piece W is easily picked up if the arcuate portion 20 is held, and this portion has the lowest degree of tendency to catch other work pieces W. This applies not only to a case of the work piece having the U-letter type partial shape, but also to a case of a work piece having a J-letter type partial shape or the like by which other work piece tends to not be caught when an arcuate portion is held to easily pick up the work piece.

Figure 2B:
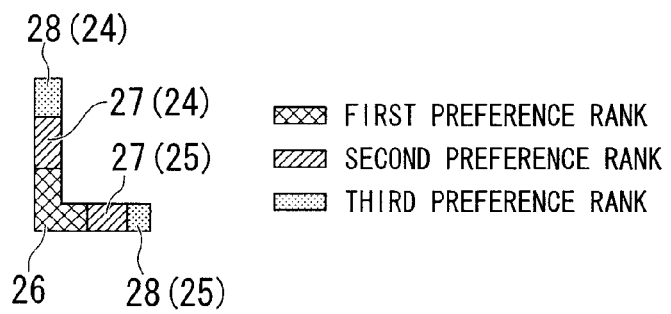
FIG. 2B illustrates an L-letter type partial shape, which is one of representative partial shapes in the work pieces according to the embodiment.

FIG. 2B illustrates an L-letter type partial shape which is one of the representative partial shapes included in the work pieces W. This partial shape is formed by a long portion 24 and a short portion 25 which are connected at a right angle. The first preference rank of the holding positions is given to a corner portion 26 formed by the long portion 24 and the short portion 25. The second preference rank is given to straight portions 27, 27 of the long portion 24 and the short portion 25 that are adjacent to the corner portion 26. The third preference rank is given to straight portions 28, 28 that include end portions continued to the straight portions 27, 27. This applies not only to a case of the work piece having the L-letter type partial shape, but also to a case of a work piece having a V-letter type partial shape or the like by which other work piece tends to not be caught when a corner portion is held to easily pick up the work piece.

Figure 2C:
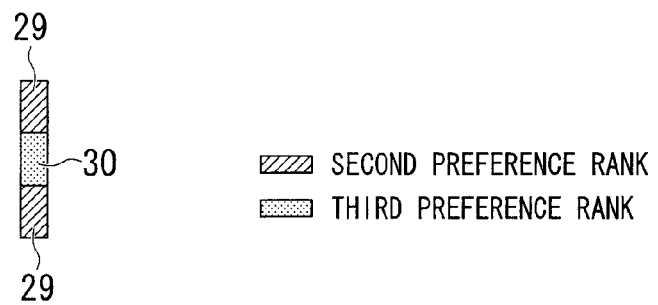
FIG. 2C illustrates an I-letter type partial shape, which is one of representative partial shapes in the work pieces according to the embodiment.

FIG. 2C illustrates an I-letter type partial shape which is one of the representative partial shapes included in the work pieces W. This partial shape is straight and thus other work pieces tend to not be caught, thus, the preference orders are given from the second preference rank. The second preference rank is given to straight portions 29 of both ends, and the third preference rank is given to a straight portion 30 in the middle.

Figure 2D:
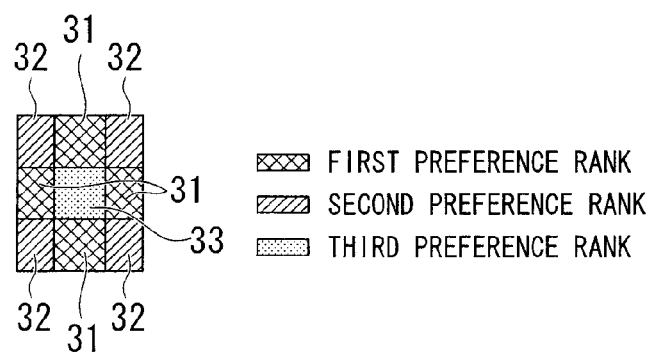
FIG. 2D illustrates a square type partial shape, which is one of representative partial shapes in the work pieces according to the embodiment.

FIG. 2D illustrates a plane square type partial shape which is one of the representative partial shapes included in the work pieces W. In this partial shape, the first preference rank of the holding positions is given to each of the side-central portions 31 not including a center portion. The second preference rank is given to each corner portion 32. The third preference rank is given to the center portion 33. These representative partial shapes and preference ranks of the holding positions of the work pieces are preliminary stored in the partial shape storage unit 8. Note that, in FIGS. 2A-2D, the first preference rank is indicated by a cross-hatching, the second preference rank is indicated by a hatching, and the third preference rank is indicated by a point-hatching.

Next, explanations are given regarding processes for picking up the work pieces W which are randomly accumulated in the bucket 2, by means of a robot arm 3A of a robot 3.

In a first step, as shown in FIGS. 2A-2D, data of representative partial shapes in the work pieces W to be held, and data of preference ranks of the holding positions associated with the representative partial shapes are stored in the partial shape storage unit 8. In the following example, work pieces W each having U-letter type partial shape are held, therefore, data of the U-letter type and data of each holding position to which the first preference rank, the second preference rank, or the third preference rank of the holding positions is given, are stored.

Figure 5:
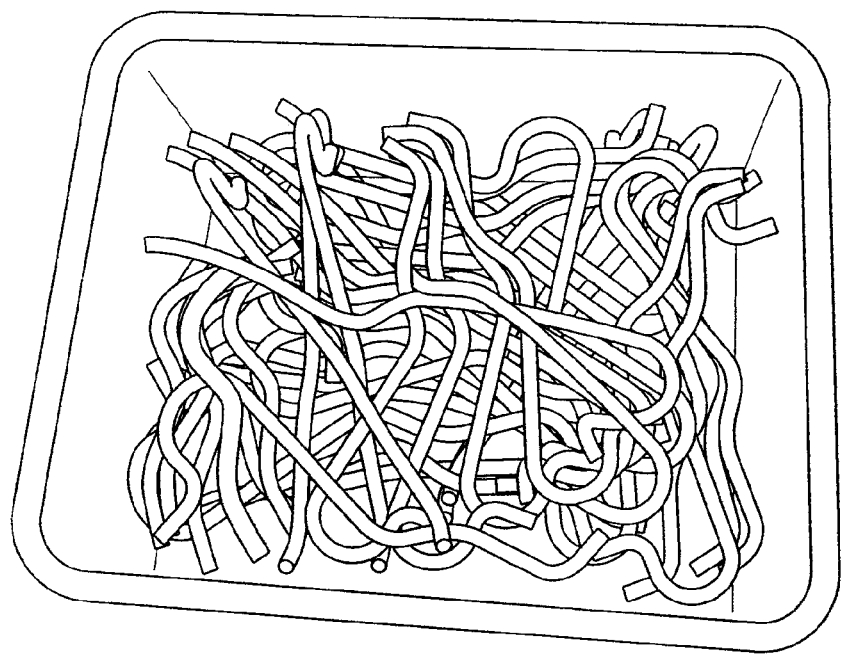
FIG. 5 is a perspective view of randomly accumulated work pieces according to the embodiment.

In the next step, as shown in FIG. 5, the work pieces W randomly accumulated in the bucket 2 are captured by a stereo camera 4 attached to the robot arm 3A of the robot 3 which is illustrated in FIG. 1. The obtained image information of the portion exposed outside is stored in the image information storage unit 5.

Figure 6:
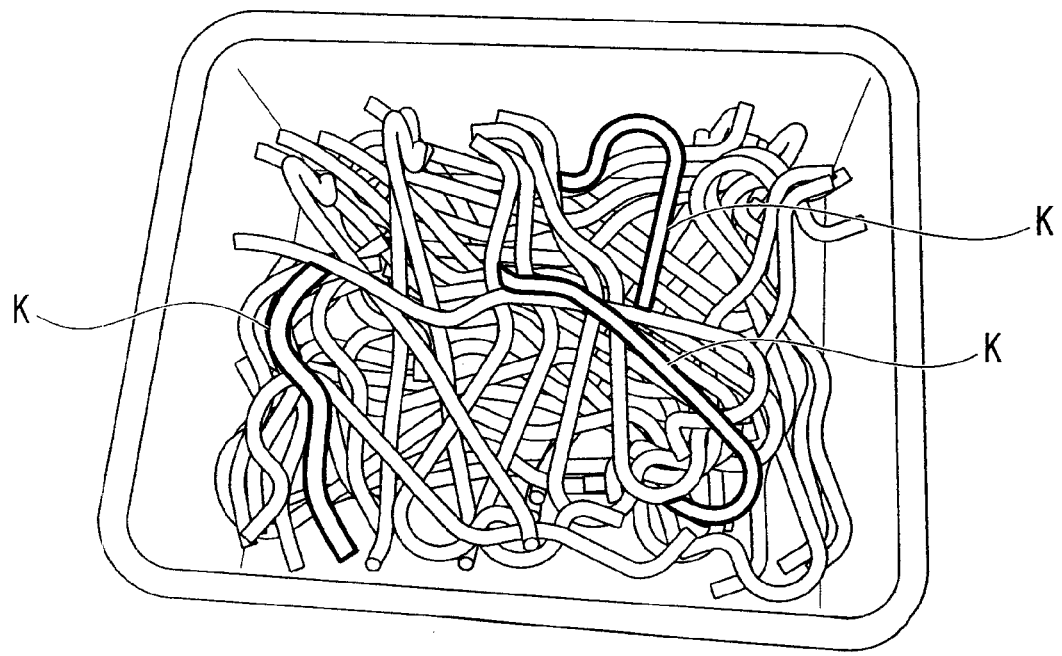
FIG. 6 is a perspective view which corresponds to FIG. 5 and indicates selected work pieces.

As shown in FIG. 6, the image information stored in the image information storage unit 5 is subject to an edge detection performed by the edge detection unit 6, and the areas in the image are calculated. Then, some work pieces W substantially at the top position where the overlapping degree is relatively small, that is, the work pieces having relatively large area, are selected (e.g., three work pieces having the three largest areas are selected). Therefore, the work pieces W can be selected at high speed.

In this step, the edge detection performed by the edge detection unit 6 may basically determine a portion where the variation ratio of the brightness values in the image information is large as a border portion K. However, if it is impossible to perform such edge detection based only on the brightness, an image within a specific distance range may be extracted from the image information including the distance information. Then, the edge detection can be performed by using the image information having the brightness corresponding to the extracted image. It should be noted that, in FIG. 6, the border portions K are indicated by the thick lines.

Figure 7:
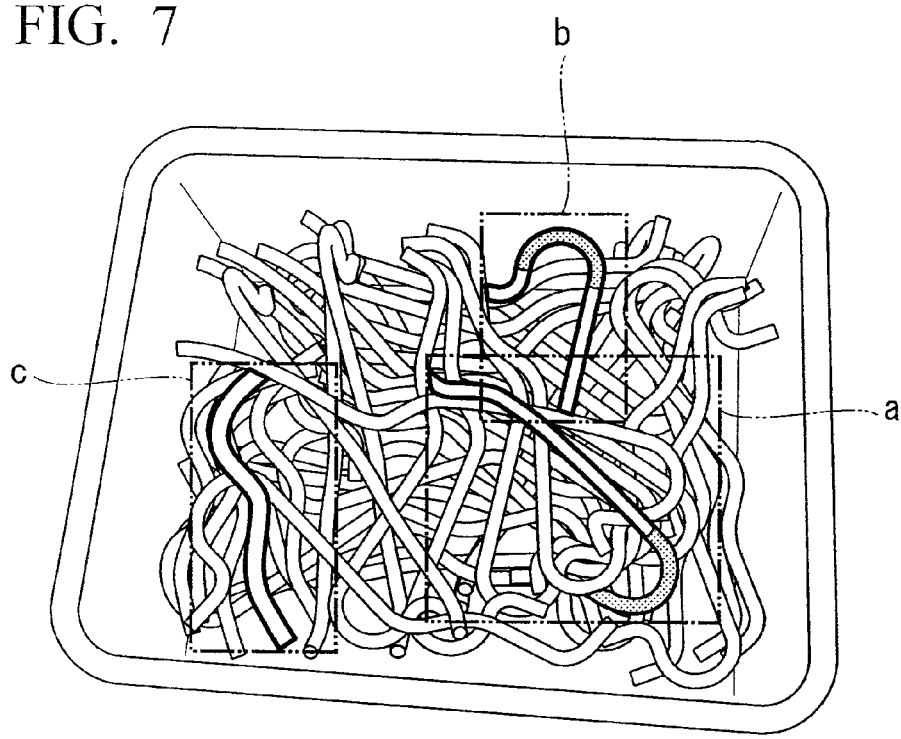
FIG. 7 is a perspective view which corresponds to FIG. 6 and indicates representative partial shapes of the work pieces and areas around them.

Then, the selected work pieces W are extracted by the image extraction unit 7 and stored in the image information storage unit 5. At this time, as shown in FIG. 7, the extracted images include areas around the work pieces W (e.g., squares "a", "b", and "c" in FIG. 7). Then, for these focused areas, the matching determination unit 9 determines whether or not the partial shapes in the work pieces W match with a representative partial shape preliminary stored in the partial shape storage unit 8. Based on this result, matched portions are selected. Since the areas to be determined are focused as explained above, the matching speed can be increased.

Figure 8:
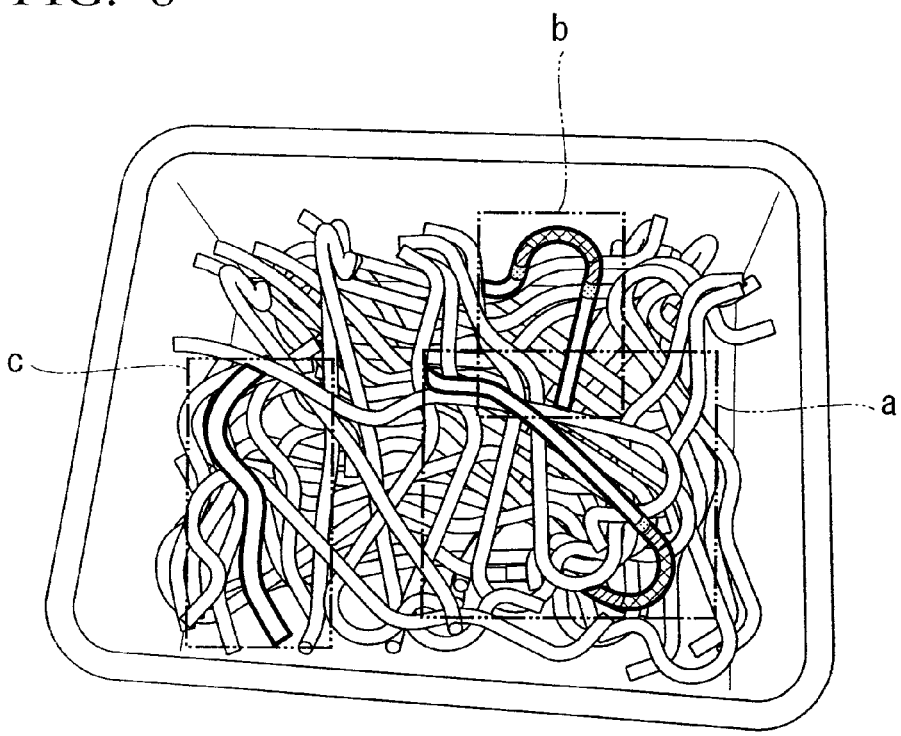
FIG. 8 is a perspective view which corresponds to FIG. 7 and indicates preference holding ranks.

Then, based on the determination result, for the work pieces W including the matched portion (i.e., point-hatched portions in FIG. 7), portions having the precedent preference holding ranks are mapped as shown in FIG. 8 (i.e., cross-hatched portion, hatched portion, and point-hatched portion in FIG. 8) and the position to be held is determined based on the preference rank by the holding position setting unit 10. Since the preference ranks are preliminary determined based on the shape, the holding position can be set at high speed.

Figure 9:
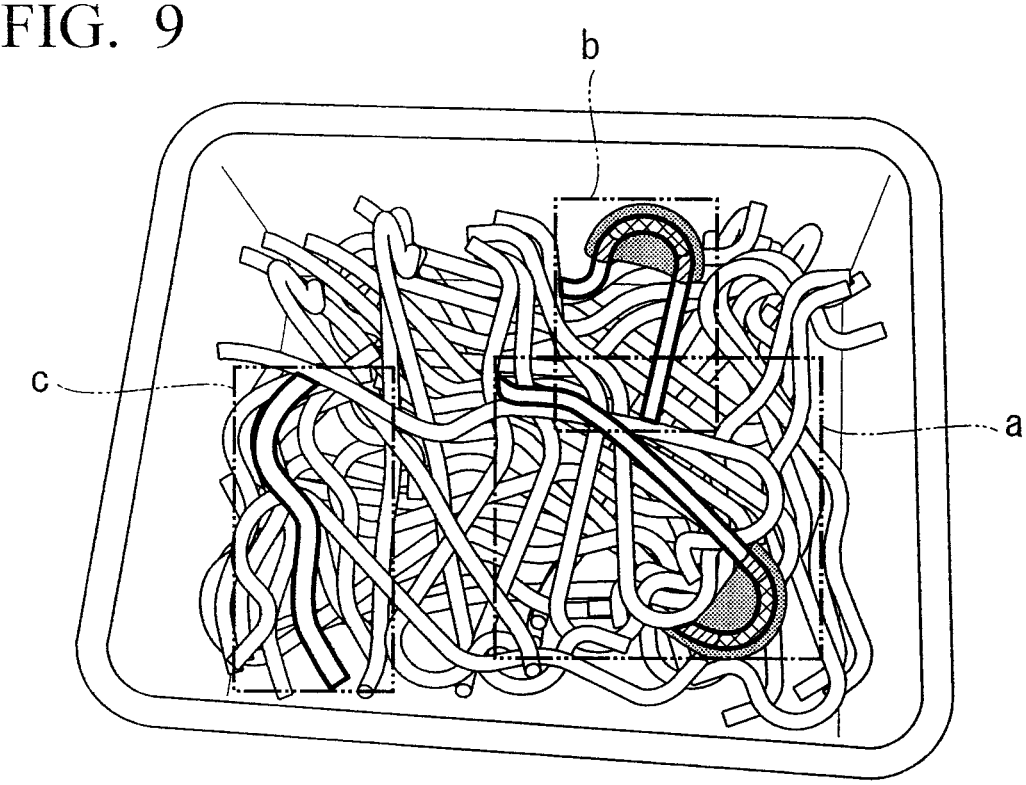
FIG. 9 is a perspective view which corresponds to FIG. 8 and indicates clearances.

In this step, the holding position setting unit 10 receives clearance information regarding the vicinity of the holding position from the image information storage unit 5. As indicated by the point hatching in the regions of the square "a" and the square "b" in FIG. 9, only in a case that a clearance for holding the work piece W is ensured (e.g., there are clearances only around the cross-hatched portion and the hatched portion in FIG. 8), the holding position is accurately calculated based on the clearance information. Then, based on the calculation, the holding command is transmitted to the controller 11. Meanwhile, if the clearance is not sufficient, a holding position assigned with the next precedent preference rank is selected.

Then, the controller 11 that received the command drives the robot 3, and the robot arm 3A holds the optimal holding position (holding position having the precedent preference rank) that has a clearance for picking up the work piece W. Then, the work pieces W are picked up from the bucket 2.

According to the above embodiment, there is no need to store a master model of the work piece W. It is sufficient if the partial shape storage unit 8 stores representative partial shapes such as selected U-letter type partial shape, L-letter type partial shape, I-type partial shape, or square type partial shape, and the first to third preference ranks that represent the degree of tendency to not catch other work piece W when each of the partial shapes is held. Therefore, there are advantageous effects in that the content of the database can be minimized and the configuration can thereby be simplified.

In addition, for the preliminarily selected U-letter type partial shape, L-letter type partial shape, I-letter type partial shape, and square type partial shape, the preference ranks that represent the degree of tendency to not catch other work piece W at the time of holding each partial shape are gradually set from the first preference rank to the third preference rank. Therefore, the holding position of the randomly accumulated work pieces W can be determined at high speed, thereby making it possible to pick up the work pieces W at high speed. In addition, for each partial shape, the portion which has a precedent preference rank of the suitable holding positions for picking up the work piece is selected, therefore, it is possible to obtain an effect of reliably preventing the picked up work piece W from catching other work pieces W.

In addition, for holding the work piece by the robot arm 3A of the robot 3, a clearance requirement is set for the work piece position to be held. Therefore, the work piece W can be reliably held.

In addition, the preference ranks are given to holding positions. Therefore, if the work piece cannot be held due to the lack of clearance, the holding position can be changed to a holding position to which the next precedent preference rank is given, thus, the time for holding can be shortened.

The present invention is not limited only to the above embodiment. For example, in the determination of the preference ranks of the holding positions, the preference ranks may be set not only based on the shape, but also based on the ease of handling by the robot arm 3A of the robot 3. More specifically, since it is easy to hold a planer portion or a portion having few protrusions or recesses, the degree of the evenness or the degree of flatness may be taken into the consideration as the requirement. Further, since it is easy to hold a portion having a tendency to not slip, the degree of tendency to not slip or the degree of tendency to not get scratched may be considered to decide preference ranks. Further, four kinds of the representative partial shapes are taken as examples in the above explanation, but the representative partial shapes are not limited to four kinds. Furthermore, the preference ranks are provided in three grades, but the preference ranks should not be limited to three grades.

INDUSTRIAL APPLICABILITY

According to the method for picking up a work piece, it is possible to reliably pick up work pieces in a short time, and to suppress the catching of other work pieces at the time of picking up the work piece, thus can contribute to the speeding up of the manufacturing line.

REFERENCE SIGNS LIST

1 Work piece picking up apparatus
2 Bucket
3 Robot
3A Robot arm
4 Stereo camera
K Border portion
W Work piece The invention of claimed is:

1. A method for picking up work pieces, comprising:
    storing a representative partial shape, at least one holding position of the representative partial shape, and a preference rank for the at least one holding position in a partial shape storage unit;
    obtaining image information by sensing the work pieces which are accumulated and storing the image information in an image information storage unit;
    recognizing exposed portions of the work pieces by performing edge detection on the image information with an edge detection processor;
    selecting at least one of the exposed portions with an image extraction processor;
    detecting at least one coinciding portion of the selected exposed portion that coincides with the representative partial shape with a matching determination processor;
    determining an optimal holding position for the detected coinciding portion with a holding position setting processor, wherein the optimal determined holding position is based on the preference rank;
    transmitting a holding command to hold the work piece that includes the selected portion by the optimal determined holding position to a controller; and
    controlling a robot arm to grasp the optimal determined holding position of the work piece that includes the selected portion.

2. The method for picking up work pieces according to claim 1, wherein
    the preference rank is based upon a tendency of the work piece that includes the selected portion, when held by the holding position, to not catch other work pieces.

3. The method for picking up work pieces according to claim 1, wherein
    the preference rank is based upon on a degree of ease to hold the optimal determined holding position.

4. The method for picking up work pieces according to claim 1, further comprising:
    obtaining clearance information for the work piece that includes the selected portion,
    wherein when the clearance information indicates that clearance is not sufficient, selecting a holding position having a next precedent preference rank.

* * * * *